United States Patent [19]

Brüggen et al.

[11] Patent Number: 4,561,064
[45] Date of Patent: Dec. 24, 1985

[54] NON-CONTACTING DISTANCE MEASURING SYSTEM

[76] Inventors: Gerhard Brüggen, Löwenstrasse 95, D-7000 Stuttgart 70; Dieter Karr, Hans Reyhin 47, D-7250 Leonberg; Wolfgang Rottler, Kopernikusweg 2, D-7145 Markgröningen, all of Fed. Rep. of Germany

[21] Appl. No.: 470,467

[22] Filed: Feb. 28, 1983

[30] Foreign Application Priority Data

Mar. 5, 1983 [DE] Fed. Rep. of Germany ....... 3207950

[51] Int. Cl.$^4$ .............................................. G08G 1/00
[52] U.S. Cl. ..................................... 364/561; 364/461; 364/571; 340/904; 367/902
[58] Field of Search ............... 364/460, 461, 561, 571; 340/901–904; 367/13, 902, 908; 343/7 VM, 17.7

[56] References Cited

U.S. PATENT DOCUMENTS

| | | | |
|---|---|---|---|
| 3,184,969 | 5/1965 | Bolton | 367/902 |
| 3,360,775 | 12/1967 | Schroeder | 340/904 |
| 4,015,232 | 3/1977 | Sindle | 340/904 |
| 4,210,969 | 7/1980 | Massa | 367/902 |
| 4,240,152 | 12/1980 | Duncan et al. | 340/901 |
| 4,278,962 | 7/1981 | Lin | 340/904 |
| 4,300,116 | 11/1981 | Stahovec | 340/904 |
| 4,467,313 | 8/1984 | Yoshino et al. | 340/903 |
| 4,490,716 | 12/1984 | Tsuda et al. | 340/904 |

*Primary Examiner*—Gary Chin
*Attorney, Agent, or Firm*—Frishauf, Holtz, Goodman & Woodward

[57] ABSTRACT

To determine if a pulsed beam system, typically an ultrasonic pulsed beam system, which is located externally of a motor vehicle is in operative condition, a transmitter (14) projects a beam to a fixed reflector (16) located on the vehicle, and one (19) of a group of timing stages (18; 19, 20, 21) evaluates the transit time to the reflector. If the transit time to the reflector is slightly less than a predetermined time interval (Tc), so that the threshold timing level (Tc) is passed, a first indication, for example a frequency at a first tone (f1), generated by an acoustic tone generator (30) is reproduced in a loudspeaker; if, then, an obstruction is sensed by the beam, and the distance between the transmitter (14) and the obstruction (17) which forms a reflecting object drops below a first predetermined distance represented by a time period (T2), a second one of the transit time stages responds, and, through logic gates (22–24, 28, 29) provides a second discrete output frequency (f2) in the loudspeaker. If the vehicle closely approaches the reflecting object or obstruction (17), a third frequency (f3) is reproduced by the loudspeaker (26) and, additionally, a warning signal can be given. The system can be connected to the reverse gear or rear light switch, so that, if no obstruction is sensed, and only the signal from the reflector is reproduced, an audible indication of "reverse gear engaged" is provided, thus simultaneously providing a reverse gear signal as well as a signal representative of proper operation of the system. To compensate for ambient condition, dirt on the transmitters, and the like, the timing intervals by the transit time stages responding to the obstruction can be changed (FIG. 2) by providing a calibrating input based on actual transit time from the transmitter (14) to the fixed reflector (16).

15 Claims, 2 Drawing Figures

NON-CONTACTING DISTANCE MEASURING SYSTEM

Reference to related patents and publications: U.S. Pat. No. 3,366,925, German Patent Disclosure Documents DE-OS No. 2 312 248 DE-OS No. 2 531 665, the disclosure of which is hereby incorporated by reference.

The present invention relates to a non-contacting distance measuring system, and more particularly to a system which is suitable to assist in parking of automotive vehicles, and/or when backing an automotive vehicle, to obtain an output indication when a predetermined distance between the back of the vehicle and an obstruction, for example another vehicle, is obtained; and especially to such a system which provides, inherently, for testing and calibrating the system when in use.

1. Background.

Various types of systems to determine the distance between two objects, without contact, have been proposed. To park vehicles, the systems in the above-described references and U.S. Pat. No. 3,366,925 are ultrasonic or infrared beam transmitting systems which operate on the basis of determination of the transit time of radiation between a transmitter and a reflector to obtain a distance measurement.

Systems of this type, particularly when used in conjunction with automotive vehicles, have the disadvantage that the respective transmitter and receiver sensors can become dirty, and thus either inoperative or have impaired operative characteristics; further, the transit time from a transmitting vibrating crystal, or other type of transmitter, for example through a cake of mud, road sand and the like, may be different from that when the transmitter, and its housing, is clean. Thus, false measurements can be obtained. The false measurement then can give the user the illusion of safety and that a minimum distance has not yet been obtained although, due to malfunction of a system, for example caused by road contamination, the distance between the vehicle being parked and an obstruction, for example another vehicle, has dropped below a safe minimum. Malfunction of the system by providing erroneous output is worse than no output at all, since then the operator can rely on his own skill. Due to the location of the respective transducer units, however, it is frequently very difficult to test the system, particularly at the time when it is most needed. Yet, an obstruction indication is still most important.

2. The Invention.

It is an object to provide a non-contacting distance measuring system, and more particularly a system which is subject to the rough use encountered in parking distance measurement systems, which is reliable in use, permits calibration, and provides an operability output signal to the operator, so that the operator will be assured that the system is working properly before placing reliance thereon.

Briefly, a reflector is located on the transmitting object, typically the vehicle being parked, and positioned at a predetermined distance from a beam transmitter; the transmitted beam may be an infrared beam, an ultrasonic beam, or the like. The reflector is coupled to a functionality testing arrangement which, in turn, is coupled to a transit time determination stage and responsive to the transmitted beam, which is reflected by the reflector and received in a receiver. The receiver is connected to and controls an indicator to provide an output which is characteristic for a function test of the beam when the system is energized. Thus, if the reflector reflects a signal, this state is indicated. When the beam meets an object and is reflected back from an object, the transit time of the remaining portion of the reflected beam is analyzed and, at that time, a second characteristic output signal is provided, disabling the first or test output signal. The second signal then provides the operator with an indication that a certain predetermined distance between the transmitting object—typically the vehicle to be parked—and an obstruction is reached. If the transmitting object continues to approach the obstruction, a third characteristic signal can be provided, coupled for example with an alaram indicator, and indicating to the operator that the distance between the transmitting object, for example the vehicle to be parked, and the obstruction, for example a wall or another vehicle, has dropped below a second predetermined, and possibly unsafe value.

Preferably, the measuring signal is formed by a pulse train which, desirably, is an ultrasonic signal. A plurality of timing stages, coupled to threshold stages, provide for testing the signal with respect to predetermined transit times and controlling generation of the respective discrete output signals.

The calibrating system can be so arranged that the actual transit time from the transmitter to the fixed reflector is determined, and the timing of the respective timing stages controlled in accordance with this actual time. Since the distance between the transmitter and the reflector on the measuring object—typically a vehicle to be parked—is known, the distance to an obstructing object can then readily be obtained.

The system has the advantage that continuous operability of the system is tested, and an output indication provided. Thus, erroneous outputs or erroneous reliance on the system, although it is malfunctioning, can be prevented. The reflector is preferably located very close to the transmitter, for example spaced by about 1 cm therefrom. This signal, which thus has a very short transit time, provides information regarding operability of the entire system without influencing the actual measuring of the distance to an obstructing object as such.

Operation with ultrasonic signals is particularly desirable, especially if provided in the form of pulse trains, or groups of pulses. Reliable operation with ultrasonic systems is made possible, essentially, by continuous supervision of the system by the above referred-to test reflector, and evaluation of signals based thereon.

The system can readily indicate distance from the transmitting object to an obstruction continuously by, for example, providing an analog output; in accordance with a preferred feature of the invention, however, various distance stages or distance steps are provided, the system responding to one or more predetermined distances from the obstructing object which, each, generate a specific and characteristic acoustic and/or optical signal to indicate to the operator that certain minimum distances have been passed.

Particularly precise indication of the distance is obtained by recalibrating the system dynamically, that is, utilizing the transit time to the reflector to modify the response time of the timing stage, or timing stages, which convert the response time to actual distance indicated to the operator. The response values of the respective transit time conversion stages thus are changed by suitable change of the response time of the signal reflected from the reflector. Thus, changes in temperature, air pressure, humidity, and other changes in parameters to which the transmitted beam signal is subject will not influence the resulting measured distance. Likewise, accumulation of dirt, road deposits and the like will then not interfere with accuracy of measurement.

The distance measurement system is particularly suitable for parking an automotive vehicle. If so used, the transmitter and receivers, preferably are in form of a combined transponder unit which is located on the rear portion of the vehicle. The entire system can be automatically enabled by connecting it to the reverse-light switch, which is activated whenever the reverse gear of the vehicle is engaged. The signal indicating operability of the system can then, simultaneously, additionally provide an output signal to the operator that the reverse gear has been engaged. Two transmitter and receiver systems can be provided, one each at the left and right side of the vehicle. in order to determine on which side of the vehicle the distance from an obstructing object has dropped below a critical minimum.

The indicators may be optical, and respond, for example, when a predetermined minimum distance is passed. Preferably, they are located in the rear portion of the passenger compartment of the vehicle, for example at the back side of additional brake light indicators, visible from the passenger compartment of the vehicle; if acoustic, and the vehicle is equipped with rear speakers, acoustic indication is preferably provided from the rear speakers, which can be associated with right-and-left rear speakers respectively. The indicator may, of course, also be located on the dashboard, a console, or the like. Association of a critical distance with the entire rear portion of the vehicle, or a respective right or left side thereof, can therefore be readily provided.

DRAWINGS

FIG. 1 is a schematic block diagram of the system adapted for installation in an automotive vehicle, which is shown only highly schematically; and FIG. 2 is a schematic diagram illustrating a self-calibrating system.

DETAILED DESCRIPTION

Figure 1:
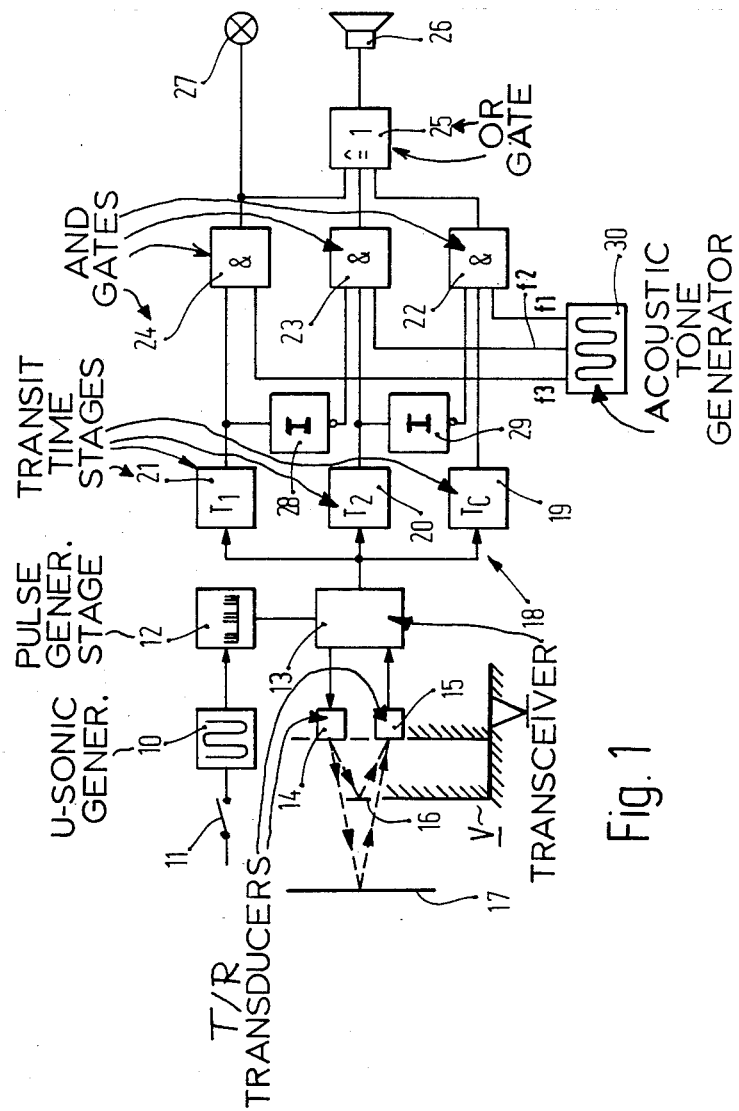

A vehicle, shown schematically only a V, has a switch 11 coupled to the reverse gear lever, which is closed whenever the reverse gear is engaged. The switch 11 is coupled to a source of electrical power. Switch 11, when closed, energizes an ultrasonic frequency generator 10. The switch 11, of course, may be any ON-OFF switch for energizing the system. The ultrasonic generator 10 is coupled to a pulse generating stage 12 which separates the continuous ultrasonic frequencies from generator 10 into pulse trains, separated by pulse gaps. Pulse generating stage 12 is connected to a transceiver 13. Transceiver 13 is connected to supply a transmitting transducer 14 with transmitted ultrasonic pulses, and to receive reflected pulses from a receiving transducer 15. Additionally, a fixed reflector 16 is secured to the vehicle V.

Pulses transmitted from the transmitting transducer 14 are reflected, in part, by the reflector 16 and, additionally, by other objects, schematically indicated by the line 17. Line 17 may, for example, be a wall, another vehicle, or the like—in general, the object with respect to which the distance from the transmitting object, here the vehicle, is to be measured. The relative distance between the transmitting object, here the vehicle V, and the object 17, which may be termed the reflecting object, changes.

Reflector 16 is located at a predetermined fixed distance from the transmitting transducer 14; a suitable distance for a vehicle is, for example, about 1 cm. The principle of operation of the transmit/receive (T/R) transducers and the transceiver 13 is based on the principle of determining the transit time from the transmitter 14 to the reflector 16, or the reflecting object 17, respectively, and, once the transit time is known, calculating the distance. The principle of such distance measurement is well known; the referenced literature provides examples of descriptions therefor.

The output of the transceiver 13 is coupled to a plurality of inputs of a transit time determination stage 18. Transit time determination stage 18, in accordance with a feature of the invention, has three specific stepped transit time stages 19, 20, 21 which are provided to recognize respective transit times Tc, T2 and T1. Whenever the transit time of a transmitted beam from the transducer 14 to the reflector 16, or the object 17, respectively, drops below a predetermined limit, as determined by the transit times Tc, T2 and T1, outputs are generated thereby. The outputs of the transit time recognition stages 19, 20, 21 are connected over AND-gates 22, 23, 24 to the inputs of an OR-gate 25, the output of which controls an acoustic output indicator 26 which, for example, can be coupled to a loudspeaker within the vehicle. If two such systems are provided, one for each side of the vehicle, the respective right and left loudspeakers of a stereo system can be energized. Rather than using a loudspeaker, a buzzer, bell, or the like can be used. The output of the AND-gate 24 is, additionally, connected with an alarm indicator 27, for example a light.

The output of the transit time stage 21 is connected over an inverter 28 with a further input of the AND-gate 23; the output of the transit time stage 20 is connected over an inverter 29 with a further input of the AND-gate 22. A signal generator 30 is provided to generate a plurality of acoustic signals f1, f2, f3. The respective frequencies from the generator 30 are connected to further inputs of the AND-gates 22, 23, 24. The respectively different acoustic signals, for example, can be different frequencies; alternatively, the signals can be of one frequency, but with different repetition rates; or a combinaion of both.

Operation: The operation of the distance measuring system is based on measuring the transit time of a measuring signal, in the present case an ultrasonic signal, from the transmitter 14 to an object 17, the distance to which is to be measured, and the reflected signal as received in a receiver 15. The time between the transmission and reception is then evaluated in the transit time system 18, formed by stages 19, 20, 21, and compared with predetermined transit time intervals Tc, T2, T1. The respective transit time stage 19, 20, 21 provides an output signal if the transit time associated with the respective stage has dropped below the threshold level thereof.

Transit time stage 19 is always so set that the transit time Tc thereof is somewhat less than the transit time of a test signal which is transmitted from transmitter 14 and received in receiver 15 after having been reflected by the fixed or test or calibrating reflector 16. The transit time stage 19 is used for continuous testing of the operability of the distance measuring system.

When first energizing the system, for example by closing switch 11, the signal sequence of frequency f1, derived from the acoustic generator, is heard in the acoustic transducer 26 since the transit time tc is set to be somewhat less than the actual transit time of the signal from transmitting transducer 14 to the receiver 15. Transit time stage 19 thus provides a 1-signal, the inverter 29, by inverting a 0-signal from the stage 20, likewise provides a 1-signal, thus permitting passage of the tone f1 provided by the tone generator 30. In the vehicle, this signal has two functions: (1) it provides an output signal to the operator that the system is in operative condition; (2) an output indication that the rear gear has been engaged, that is, that the switch 11 has been closed. This switch can be coupled with or can be part of the reverse light switch.

Acoustic indicator 26, thus, will provide an output signal since the time period Tc is somewhat less than the actual coursing time of the signal reflected from reflector 16. Additionally, the transducer 14 transmits a substantial portion of its beam into space. If the vehicle approaches the reflecting object 17, the distance to which is to be measured, transit time stage 20 with timing period T2 will respond when the distance has been so low that the transit time T2 has dropped below that of the threshold level of the stage 20. In a vehicle, this transit time is preferably so arranged that it corresponds to a distance of about 30 cm (about 1 foot) or, roughly, ⅓ m. The acoustic indicator 26 will now provide an output signal at the frequencey f2. The AND-gate 22, previously supplying the output at frequency f1, is blocked through the inverter I,29, and the AND-gate 23 enabled by output from the stage 20, and a 1-signal from the inverter 28.

If the vehicle continues to approach the obstruction 17, so that the transit time of the signal will drop below the threshold time T1 which, preferably, is significantly less than the transit time T2, transit time stage 21 will respond. This applies the output frequency f3 to the transducer 26 through the OR-gate 25. AND-gates 22, 23 will be blocked by the respective inverters 29, 28. Additionally, the alarm light 27 which, for example, may be coupled to a blinker, will be energized. The tone outputs f1, f2 are inhibited by blocking of the respective AND-gates 22, 23.

Various changes may be made, and various variations of the signal sequences and signal frequencies can be used. The response of the distance recognition stage 18, in stages, is particularly suitable for automotive vehicles. More than the two response stages, in addition to the test stage 19, can be used, merely by increasing the number of transit time stages. Of course, rather than using an ultrasonic signal, an infrared (IR) signal can be used; other electromagnetic, or acoustic waves may also be used.

Figure 2:
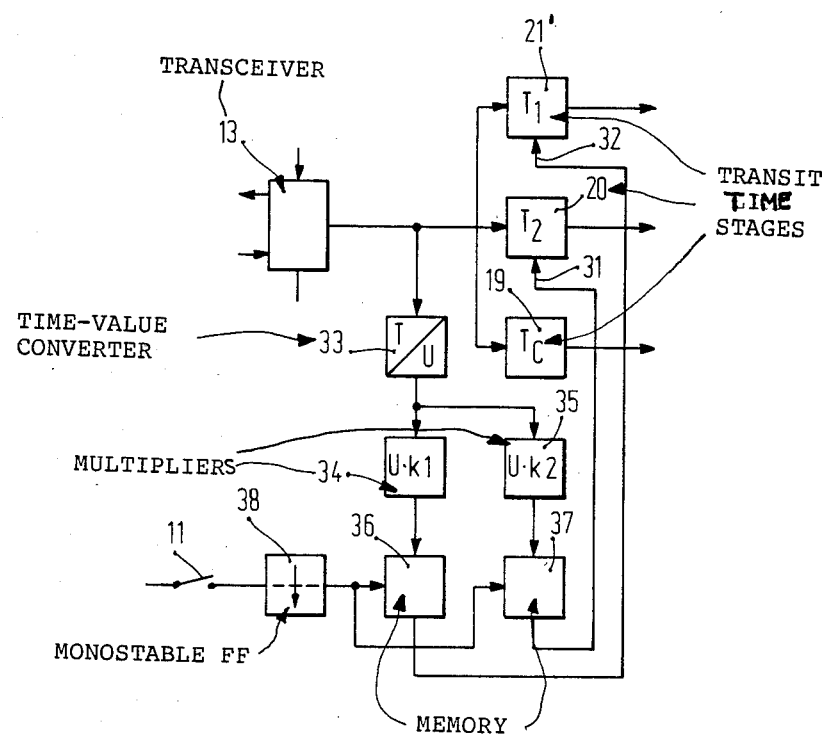

Calibration, and automatic dynamic recalibration, with reference to FIG. 2: The respective transit time stages 20, 21 can be calibrated with respect to the actual measured transit time from the transmitter to the reflector 16. Only that portion of the system of FIG. 1 is illustrated in FIG. 2 which shows the transceiver 13 and the transit time stages 19–21. The remainder of the system is identical to that of FIG. 1.

The system of FIG. 1 is based on fixed transit time settings for the stages 20, 21. In the embodiment of FIG. 2, the transit time stages 20', 21' no longer have a fixed timing interval. Rather, the timing interval of the transit time stages 20, 21 is variable and controllable by controlled inputs 31, 32. A transit time—voltage transducer 33, coupled to the transceiver 13, converts the transit time signal received from the reflector 16 into a voltage U, or into a digital signal which is representative of the voltage U, in general, to a numerical timing value. This value U is multiplied in respective multipliers 34, 35 by respective factors k1 and k2. These factors provide the ratio of the distance of the reflector 16 to the distance to be measured at which the respective stage 20', 21' is to respond when the signal is reflected by the object 17. The multiplied converted values U×k1 and U×k2 are stored in memories 36, 37. Entry of the stored value is controlled by a timing circuit 38, for example a monostable flip-flop (FF).

In accordance with a feature of the invention, the FF 38 delays storage in the memory 36, 37 for a time interval after energization of the system, which should be long enough to provide for stabilization of the system and to prevent any switching transients from affecting the accuracy of measurement. After that initial time period, the multiplied values from multipliers 34, 35 are stored in the respective memories 36, 37. The values in the memories 36, 37 are applied as timing control signals to the respective transit time stages 20', 21'.

Various other changes and modifications may be made within the scope of the inventive concept.

In a system suitable for automotive parking, the following elements are suitable:
pulse generator stage 12: SN 74123 Texas Instruments
transceiver 13: LM 1812 National Semiconductor
T/R transducers 14, 15: PKM7-405 IR Fo Stettner, Lauf b Nürnberg
transit time stages 19–21: SN 74121 Texas Instruments
time/value converter 33: SN 29776P Texas Instruments
multipliers 34, 35: μA 741
memory elements 36, 37: capacitor and μA 741
monostable FF 38, with a timing period of: 1 second

We claim:

1. In combination with a vehicle (V), a non-contacting distance measuring system for determining the distance between a transmitting object and a reflecting object (17) having an ultrasonic pulse train beam transmitter (14) for projecting an ultrasonic pulsed beam train from the rear portion of the vehicle (V) to an obstruction forming said reflectig object (17);
   means (15, 13) for receiving reflected signals from said reflecting object, including a beam receiver (15),
   said beam transmitter (14) and receiver (15) being located externally of the body of the vehicle (V);
   transit time determination means (18) coupled to the pulse projecting means in said beam transmitter, and including means for determining the time of transit of the pulses of the beam from said transmitter to said reflecting object to determine said distance when the transit time, per unit distance, is known;
   indicator means (26, 27) for providing different and discrete output indications, said indicator means furnishing an output indication when said distance drops below a pretermined value;
   a reflector (16) located on the vehicle and spaced at a prdetermined distance from said beam transmitter (14) in a portion of the beam in the path thereof;
   said transit time determination means (18) comprising a plurality of transit time stages (19, 20, 21) responding, in steps, to different transit time periods of the beam from said transmitter (14) to, respectively, said reflector (16) and the obstruction forming said reflecting object (17), and return to said receiver, one of said stepped transit time stages (19) being associated with the transit time of signals from said transmitter (14) to said reflector (16) and received in said receiver (15);

and function testing logic means (22, 23, 24, 25, 29, 30) connected to and controlled by said stepped transit time stages and responsive to the portion of the transmitted beam which is reflected by said reflector (16) and further responsive to the beam reflected from said obstruction forming said reflecting object (17) and received in said receiver (15), said function testing logic means being connected to control the discrete output provided by the indicator means to provide a first characteristic of a functionality test of the system upon energization of the system and reception of reflected signals from said reflector (16), and providing an output of a discretely different characteristic by said indicator means upon reception of signals from said obstruction forming said reflecting object (17), and disabling indication of said first characteristic by said indicator means.

2. System according to claim 1, wherein each one of said respective transit time stages generates a specifically associated discrete output signal (f1, f2, f3).

3. System according to claim 2, wherein said indicator means comprises an acoustic tone generator (30) providing a plurality of discrete acoustic tones of respectively different frequency characteristics (f1, f2, f3);

and said function testing logic means includes a plurality of control gates (22, 23, 24; 25) connected to said tone generator and to said respective transit time stages (19, 20, 21) and having outputs controlling an acoustic transducer (26), said acoustic transducer forming at least part of said indicator means.

4. System according to claim 1, further including a calibrating system (33–38) coupled to at least one of said transit time stages (20', 21') and controlling the response of the transit time as a function of the transit time of the signal reflected by said reflector (16).

5. System according to claim 4, wherein at least one of said transit time stages (20', 21') has a variable transit time threshold, the transit time threshold being controlled in dependence on the measured transit time of the signal reflected by said reflector (16).

6. System according to claim 1, wherein said vehicle has a reverse gear switch (11) operated upon engagement of a reverse gear, and said system is coupled to and energized upon operation of said reverse gear switch, so that said indicator means will provide an output indication of said first characteristic upon operation of said reverse gear switch.

7. System according to claim 6, wherein said indicator means comprises optical indicators located in the rear portion of the passenger compartment of the vehicle.

8. System according to claim 6, wherein said indicator means comprises at least one loudspeaker located at the rear portion of the passenger compartment of the vehicle.

9. System according to claim 1, wherein one of said transit time stages provides an output signal when said distance between said vehicle and said obstruction forming reflecting object (17) is in the order of about 30 cm.

10. System according to claim 1 wherein two of said plurality of transit time stages (20, 21; 20', 21') are provided, one (20) of said two stages being associated with the transit time (T2) to said reflecting object in the order of about 30 cm;

and the other (21) of said two transit time stages being associated with the transit time representing a distance which is significantly less than the distance of about 30 cm.

11. In a vehicle, a method of providing a non-contacting collision avoidance distance measurement including the steps of radiating a pulsed ultrasonic measuring beam in form of a pulse train from an ultrasonic transmitter (14) located at a rear portion of the vehicle (V) towards the rear thereof;

receiving the pulsed measuring beam in a receiver (15) when reflected from an obstruction forming a reflecting object (17), said beam transmitter and beam receiver being located externally of the body of said vehicle;

determining the distance from the transmitter to the object (17) based on measurement of the transit time of the beam between said transmitter and said receiver;

and testing the operability of the system comprising providing a test reflector (16) located on said vehicle, and positioned by a predetermined distance with respect to said transmitter, and reflecting a portion of the beam to the receiver;

measuring, based on discrete transit time intervals, the transit time of the beam from the transmitter to said test reflector (16) and reflected to said receiver (15);

providing an output indication of a first discrete characteristic (f1) upon reception of signals from the reflector (16) within a first time interval associated with said predetermined distance;

timing reception of signals received from said object (17); and inhibiting generation of output signals of said first discrete characteristic and generating output signals of a second discrete characteristic (f2) if the time interval of the travel of the beam between said transmitter (14), said object, and said receiver drops below a given value.

12. Method according to claim 11, further including the step of inhibiting output signals having said second discrete characteristic and generating output signals of a third discrete characteristic (f3; 27) if said distance between said object (17) and the transmitter (14) as measured by time of transit of the signal between said transmitter (14) and said object drops below a second given distance.

13. Method according to claim 11, wherein said predetermined distance between the transmitter and the reflector is less and 1/10 of a first given distance, and a second given distance is significantly less than said first given distance, but larger than said predetermined distance from said transmitter to said reflector.

14. Method according to claim 11, further including the step of evaluating the transit time of the signal between said transmitter (14) and said reflector (16);

and controlling the time interval, representing distance, of transit time of signals between said transmitter and said object, as a function of the measured transit time of transmission between said transmitter (14) and reflector (16).

15. Method according to claim 11, wherein said vehicle has a reverse gear, and a reverse gear switch (11) operated upon engagement of said reverse gear, including the step of
energizing said transmitter (14) and said receiver (15) upon operation of said reverse gear switch (11) for carrying out all the steps as defined in claim 11, further including the step of providing said output indication of the first discrete characteristic (f1) upon operation of said switch to provide a test output defined by said first discrete characteristic even in the absence of reception of signals reflected from an obstruction forming said reflecting object (17).

* * * * *